United States Patent [19]

Joubert

[11] 4,452,920
[45] Jun. 5, 1984

[54] FLEXIBLE POLYURETHANE FOAMS HAVING JUNCTION MODIFYING PARTICULATE ADDITIVES

[75] Inventor: Michael D. Joubert, Port Melbourne, Australia

[73] Assignee: Joubert & Joubert Proprietary Limited, Victoria, Australia

[21] Appl. No.: 379,465
[22] Filed: May 18, 1982
[30] Foreign Application Priority Data May 20, 1981 [AU] Australia ................... PE8944

[51] Int. Cl.³ .............................................. C08G 18/14
[52] U.S. Cl. ................................ 521/109.1; 521/131; 521/137
[58] Field of Search ...................... 521/131, 137, 109
[56] References Cited

U.S. PATENT DOCUMENTS

| | | | |
|---|---|---|---|
| 2,740,743 | 4/1956 | Pace | 521/128 |
| 2,770,241 | 5/1954 | Winkler | 131/332 |
| 3,004,921 | 10/1961 | Stossel | 252/309 |
| 3,004,934 | 10/1961 | Dosmann et al. | 521/159 |
| 3,024,209 | 3/1962 | Ferrigno | 521/137 |
| 3,029,209 | 4/1962 | Ferrigno | 521/76 |
| 3,046,172 | 7/1962 | Reid | 428/317.9 |
| 3,051,601 | 8/1962 | Schick | 521/109 |
| 3,106,537 | 8/1963 | Simon et al. | 521/109 |
| 3,150,109 | 9/1964 | Ferrigno | 521/129 |
| 3,242,109 | 3/1966 | Showalter | 521/122 |
| 3,256,218 | 6/1966 | Knox | 521/109 |
| 3,298,976 | 1/1967 | Reinhart | 521/123 |
| 3,304,273 | 2/1967 | Stamberger | 521/88 |
| 3,382,302 | 5/1968 | Marzocchi | 264/45.3 |
| 3,441,523 | 4/1969 | Dwyer et al. | 521/120 |
| 3,467,606 | 9/1969 | Rice | 521/176 |
| 3,486,967 | 12/1969 | Fisher | 428/215 |
| 3,499,848 | 3/1970 | Weisman | 521/172 |
| 3,509,079 | 4/1970 | Hyde et al. | 521/54 |
| 3,510,392 | 5/1970 | D'Eustachio et al. | 521/170 |
| 3,538,020 | 11/1970 | Heskett et al. | 210/496 |
| 3,582,500 | 6/1971 | Carriere et al. | 521/103 |
| 3,585,157 | 6/1971 | Beck | 521/54 |
| 3,598,772 | 8/1971 | Hood et al. | 521/170 |
| 3,600,340 | 8/1971 | Patton et al. | 521/137 |
| 3,627,706 | 12/1971 | Chant | 521/122 |
| 3,640,920 | 2/1972 | Cear | 521/174 |
| 3,644,236 | 2/1972 | Macoustra | 521/155 |
| 3,647,721 | 3/1972 | Salyer et al. | 521/63 |
| 3,658,731 | 4/1972 | Richardson et al. | 521/102 |
| 3,694,385 | 9/1972 | Salyer et al. | 521/137 |
| 3,772,219 | 11/1973 | Schwarz | 521/123 |
| 3,772,222 | 11/1973 | Steward et al. | 521/163 |
| 3,772,224 | 11/1973 | Marlin et al. | 208/173 |
| 3,775,350 | 11/1973 | Juhas | 428/317.9 |
| 3,776,702 | 12/1973 | Chant | 422/133 |
| 3,805,532 | 4/1974 | Kistner | 405/264 |
| 3,826,762 | 7/1974 | Treadwell | 521/137 |
| 3,865,758 | 2/1975 | Yoshida et al. | 521/63 |
| 3,909,464 | 9/1975 | Anorga et al. | 521/160 |
| 3,917,547 | 11/1975 | Massey | 521/155 |
| 3,920,593 | 11/1975 | Adama et al. | 521/54 |
| 3,931,062 | 1/1976 | Cobbledick | 521/92 |
| 3,956,202 | 5/1976 | Iwasaki | 521/109.1 |
| 4,038,238 | 7/1977 | Cravens | 523/219 |
| 4,251,638 | 2/1981 | Raischl | 521/137 |
| 4,278,770 | 7/1981 | Chandalia et al. | 521/99 |
| 4,327,194 | 4/1982 | Chandalia | 521/137 |

FOREIGN PATENT DOCUMENTS

| | | |
|---|---|---|
| 0029021 | 5/1981 | European Pat. Off. |
| 2007218 | 9/1970 | Fed. Rep. of Germany. |
| 2556224 | 6/1977 | Fed. Rep. of Germany. |
| 1335317 | 7/1963 | France. |
| 1093173 | 11/1967 | United Kingdom. |
| 1103236 | 2/1968 | United Kingdom. |

Primary Examiner—H. S. Cockeram
Attorney, Agent, or Firm—Banner, Birch, McKie & Beckett

[57] ABSTRACT

Conventional polyurethane foam products are modified by incorporating into the urethane reaction mixture a junction modifying particulate material that is selected with a critically controlled particle size relative to certain dimensional parameters of the foamed polymer matrix. This particulate material is selected with a particle size that results in location of the material in the foam cell wall junction regions rather than in the cell walls. The resulting products provided excellent physical properties (such as modulus of compression, tensile strength, elongation and tear resistance) at lower costs than normally encountered with similar unmodified foams. The preferred junction modifying particulate materials are organic polymeric materials such as ground rubber or plastics. As a result, the large particle size materials needed to achieve the junction modifying properties can be used without causing harmful abrasion or wear of processing equipment surfaces.

14 Claims, 19 Drawing Figures

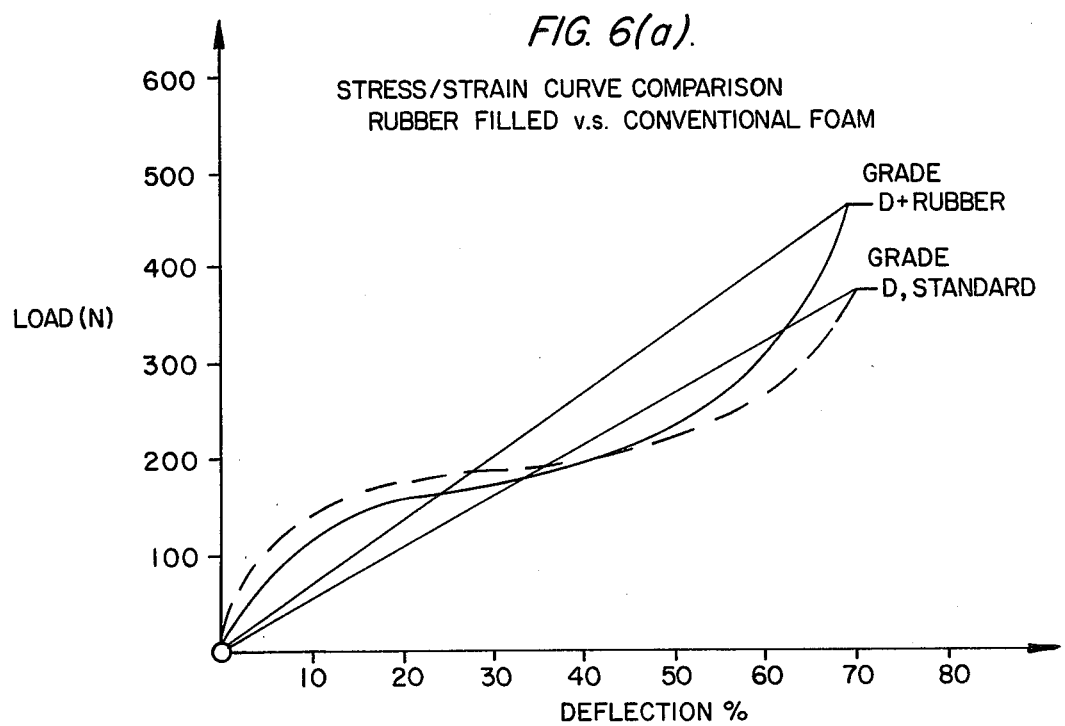
FIG. 6(a). STRESS/STRAIN CURVE COMPARISON RUBBER FILLED v.s. CONVENTIONAL FOAM
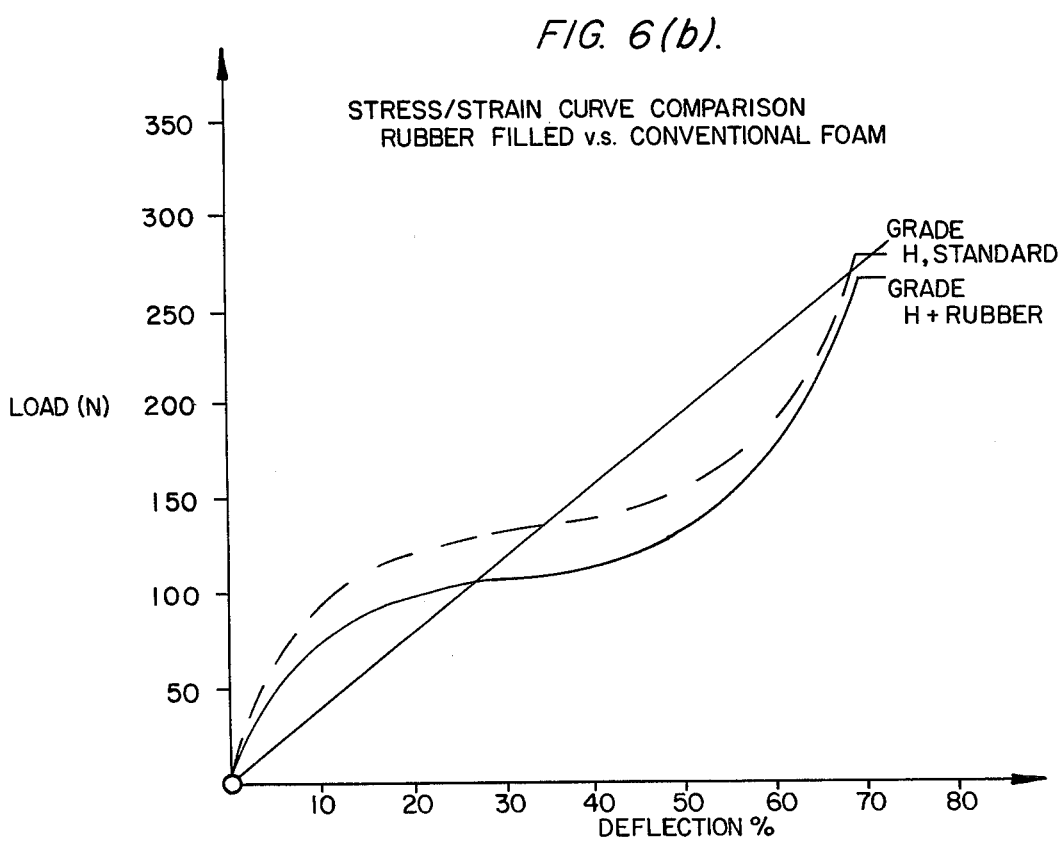
FIG. 6(b). STRESS/STRAIN CURVE COMPARISON RUBBER FILLED v.s. CONVENTIONAL FOAM

FLEXIBLE POLYURETHANE FOAMS HAVING JUNCTION MODIFYING PARTICULATE ADDITIVES

BACKGROUND OF THE INVENTION

1. Field of the Invention

The present invention relates to flexible polyurethane foams for use in cushioning materials and the like having improved physical properties. More particularly, the invention relates to polyurethane foam compositions containing junction modifying particulate additives.

2. Description of the Prior Art

Polyurethane foams are prepared by reacting, in the presence of a blowing agent, polyisocyanates with active hydrogen containing substances such as polyesters, including polyester amides, and hydroxyl containing polyethers including polyether diols and triols. Usually catalysts, such as organo-tin compounds and tertiary amines, and emulsifiers such as silicone oils are incorporated in the reaction mixture to control reaction rate, cell size and porosity.

The prior art has described many attempts to modify the properties of polyurethane foams by the addition of various inert filler materials. Typically these fillers were either organic or inorganic. In general, the prior art has taken two rather distinct approaches to the modification of flexible foams with fillers. In the more common approach, very finely divided particulate material is uniformly dispersed in the urethane precursor materials to achieve a modified product. See, e.g., Chandialia U.S. Pat. Nos. 4,278,770, Dwyer 3,441,253 and Marx 4,243,755. The art has also described the addition of very large particulate fillers to polyurethane foams. See, e.g., Knox U.S. Pat. No. 3,256,218. While the art also occasionally describes the use of intermediate size particulate additives, see, e.g., Hood U.S. Pat. No. 3,598,772 and U.K. Pat. No. 1,093,173, the prior art generally has not been able to provide a method for the consistent modification of various foam grades, densities and cell sizes. Accordingly, there has been no widespread commercial application of filled foams on anything other than a speciality product basis.

Clearly if various grades of polyurethane foams could be consistently formulated with relatively large amounts of filler material, these products would possess a significant economic advantage over unfilled structures comprised entirely of more expensive materials. This advantage would be even greater if such a modification also resulted in improved physical properties.

It is therefore an object of the present invention to provide a process for preparing modified polyurethane foams which enables the consistent production of products with excellent physical properties.

It is another object of the present invention to provide novel polyurethane foam products having excellent physical properties at substantially reduced costs.

It is also an object of the present invention to provide flexible polyurethane foam materials having a modulus of compression which is similar to that of rubber latex foam.

Another object of the present invention is to provide a modified polyurethane foam material having improved resilience characteristics so as to make it more suitable for use in furniture applications than prior art polyurethane foams.

It is also an object of the present invention to provide flexible polyurethane foam products which incorporate as a particulate property modifier recycled scrap organic polymeric materials.

It is a further object of the present invention to provide a process for producing a particulate modified flexible polyurethane foam product in a manner which does not cause accelerated wear of processing equipment.

SUMMARY OF THE INVENTION

In accordance with these and other objects which will readily occur to one skilled in the art, the present invention provides an improvement in the process for preparing flexible polyurethane foams having polymer cell walls and junction regions where a plurality of cell walls intersect, which process comprises reacting a polyol, an organic polyisocyanate, a foaming agent and a catalyst, which improvement comprises dispersing in one of the reactants a junction modifying particulate material selected with an average particle size relative to the cell dimensions such that the particulate material locates primarily in the junction regions rather than in the cell walls of the foam product.

The present invention also provides a flexible polyurethane foam material having polymer cell walls and junction regions where a plurality of cell walls intersect, and wherein from about 1 to 60% by weight of the foam material comprises a particulate organic polymeric material having an average particle size relative to the cell dimensions such that the particulate material is located primarily in the junction regions and not in the cell walls of the foam product.

BRIEF DESCRIPTION OF THE DRAWINGS

FIG. 6 is a series of graphs depicting the relationship between load and deflection for polyurethane foam products of the present invention as compared to similar prior art products.

DETAILED DESCRIPTION OF THE INVENTION

The present invention is based on the surprising discovery that the properties of polyurethane foams can be modified in a consistent and predictable fashion by employing particulate additives which have critically dimensioned particle sizes selected to provide specific relationships to the dimensional parameters of the particular foam. By carefully controlling the size and nature of particulate additives relative to the cell dimensions the applicant has found that preferential modification of the intersecting junction regions of the polymer matrix can be achieved. This junction modification results in novel products having improved compression and tension properties and products which more closely simulate the desirable attributes of higher grade polyurethane foams and rubber latex foams at a cost comparable to many lower grade polyurethane foam products.

Figure 1A:
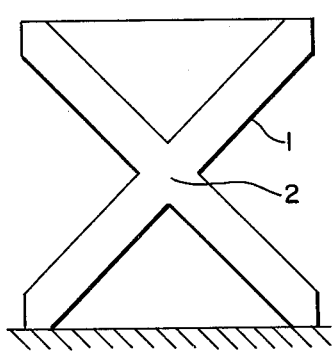
FIG. 1 is a series of schematic representations depicting the effect of compression on the prior art unfilled polyurethane foam products.
Figure 1B:
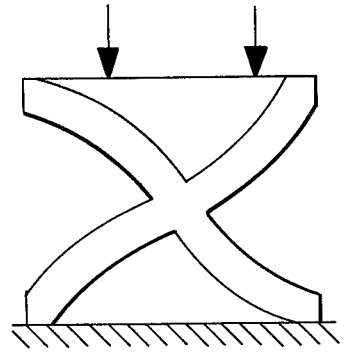
Figure 1C:
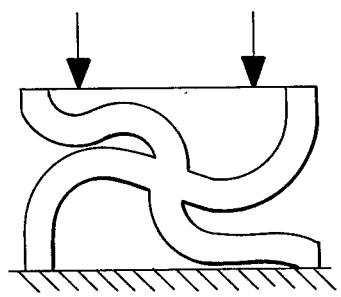
Figure 1D:
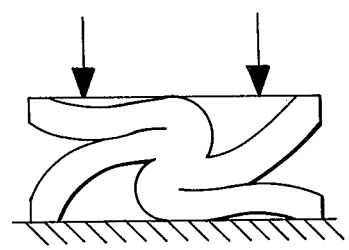

The Figures will provide a better understanding of the nature of the junction modifying technique of the present invention. Referring to FIG. 1 there is shown a series of schematic conceptual representations of a conventional unfilled polyurethane foam material undergoing compression. As used herein, the term strut or cell wall refer to portions 1 in the Figures, and the region where the struts or cell walls intersect, 2 is termed the junction region. FIG. 1(a) shows an unloaded foam product. The compression process begins with strut distortion and rotation of the junction region as seen in FIG. 1(b). FIG. 1(c) shows a more advanced state of compression exhibiting further strut distortion and partial interaction of the struts. FIG. 1(d) shows the final stage of compression in which load bearing is due to physical contact between the cell elements (far less load bearing is the result of bending moments in the struts).

Figure 2A:
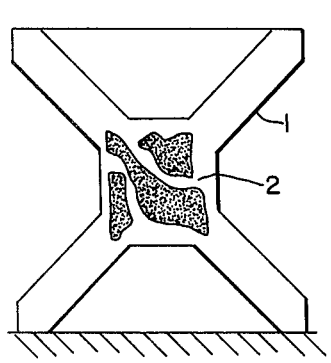
FIG. 2 is a series of schematic representations depicting the effect of compression on the junction modified polyurethane foam products of the present invention.
Figure 2B:
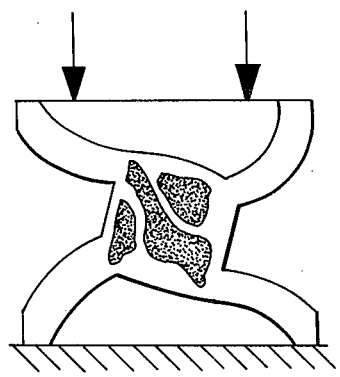
Figure 2C:
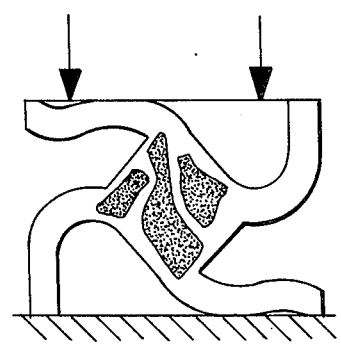

FIG. 2 shows a series of schematic conceptual representations of the effect of compression in a polyurethane foam having the junction modifying particulate additive of the present invention incorporated in junction regions. FIG. 2(a) shows the structure of the present invention under no load. Note that the incorporation of particulate material in the junction region results in a much larger junction region than is present in the unfilled material schematically represented in FIG. 1. This larger junction region, as will be explained below, aids in the development of enhanced compression and tension properties of the product of the present invention. In FIG. 2(b) the first stage of compression can be seen. In this stage, junction rotation and strut deformation similar to that exhibited by the unfilled product in FIG. 1(b) is exhibited. In the final stage of compression shown in FIG. 2(c) the support function of the larger junction area is evident at a much earlier stage of compression (compare FIGS. 1(c) and (d) with FIG. 2(c)).

Figure 3A:
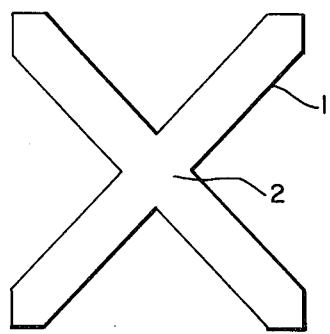
FIG. 3 is a series of schematic representations depicting the effect of tension on the prior art unfilled polyurethane foam products.
Figure 3B:
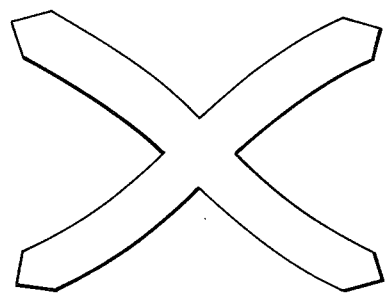
Figure 3C:
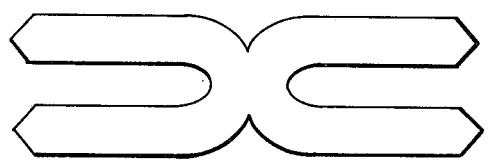
Figure 4A:
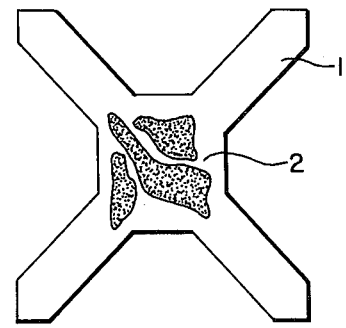
FIG. 4 is a series of schematic representations depicting the effect of tension on the junction modified polyurethane foam products of the present invention.
Figure 4B:
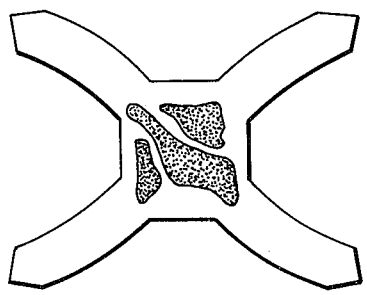
Figure 4C:
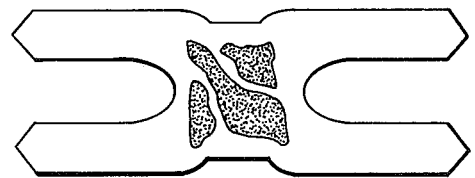
Figure 5B:
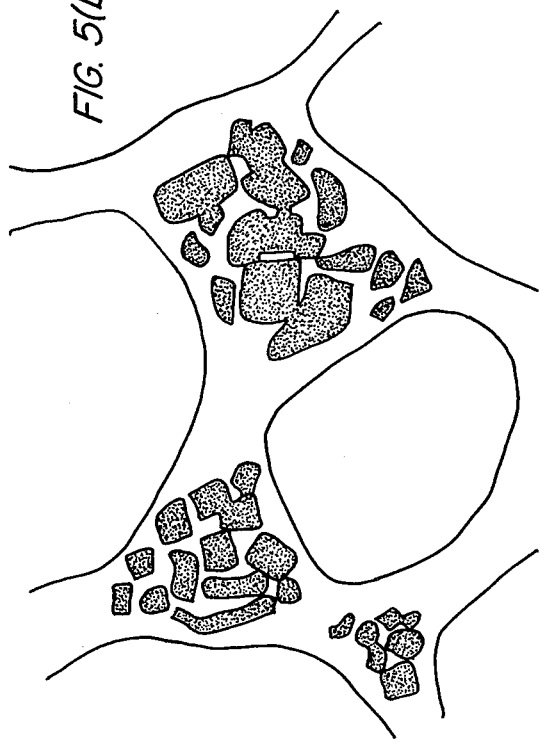
FIG. 5 is a series of schematic representations depicting the effect of particle size on the location and distribution of particulate additives to polyurethane foam products.
Figure 5D:
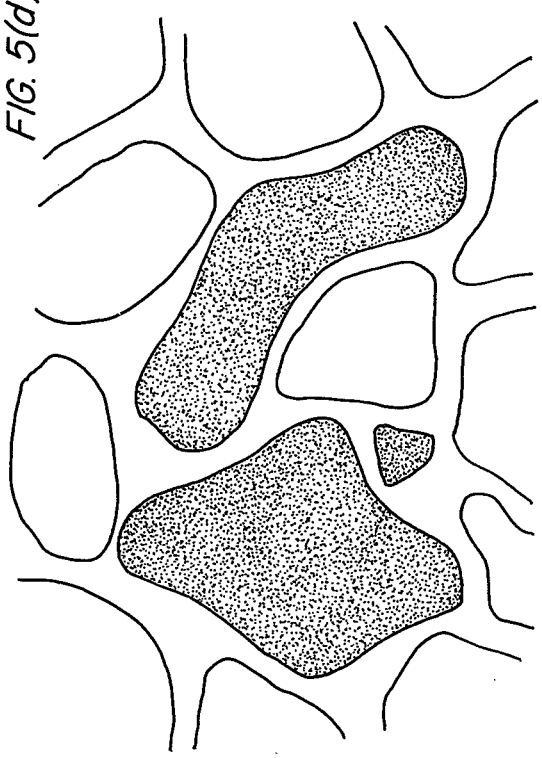
Figure 5A:
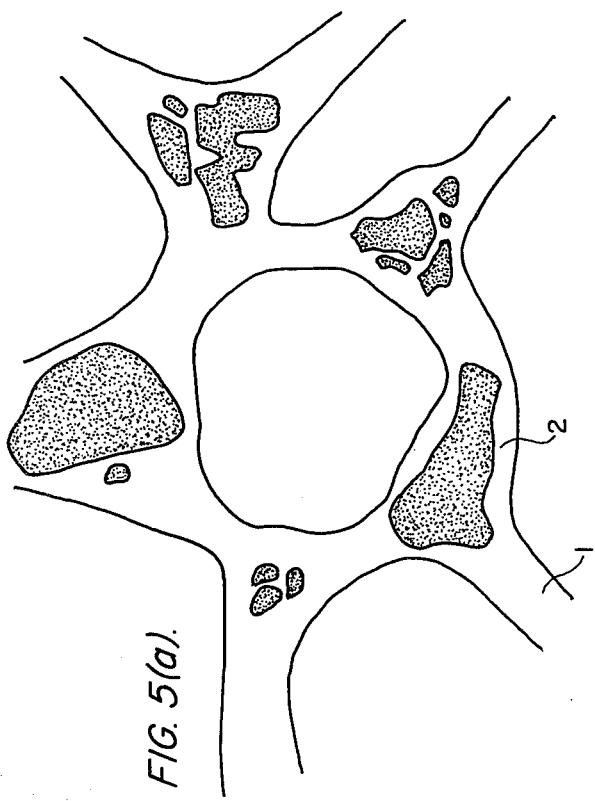
Figure 5C:
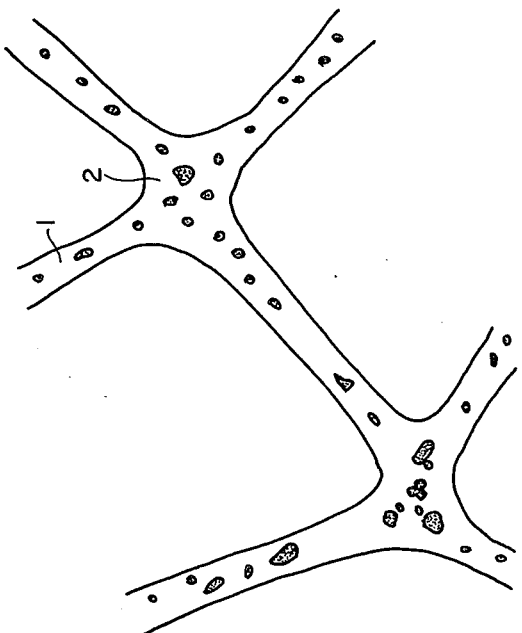

FIGS. 3 and 4 are a series of schematic conceptual representations which demonstrate why the junction modified polyurethane foams of the present invention exhibit improved tensile, tear and elongation properties. While the factors affecting these properties are rather complex and three-dimensional in nature, a comparison of FIGS. 3(a)–(c) and 4(a)–(c) clearly shows that the larger junction region of the modified foam of the present invention results in improved mechanical strain distribution.

As used herein the term average partical size means a value assigned the material based on its ability to pass through a sized screen mesh; for example, a material having an average partical size of 210 microns passes through a sieve having 210 micron openings but is retained on the next smaller size sieve i.e., 177 microns.

The term average cell size means the average internal distance from cell wall to cell wall. This dimension can be approximated by counting the number of cell openings over a distance of 25 mm (using a thread counting glass or other suitable optical instrument) to get an average cell count (average of 3 dimensions). This number is then divided into the sampled distance to get a number which is proportional to the actual cell dimensions. An approximate ratio of this number to the internal cell dimensions is about 10:28.

The term average strut thickness means a value calculated by measuring the length on one side of a strut, as near the center between junctions as possible, (in cross section a strut is an oblique hyperbolic triangle), and dividing this side measurement by two. This approximated strut thickness is considered to be the diameter of a circle equivalent to the strut area.

The particulate material used according to the present invention to modify the junction regions of the polyurethane foam may be any one or more of a number of conventional inorganic or organic filler materials. The junction modifying particulate materials may be of regular (e.g., spherical) or irregular shape and can include both solid particles and particles containing voids (e.g., hollow spheres). According to the preferred embodiment of the invention, these particulate materials comprise organic polymeric materials. Of particular interest are recycled organic polymeric scrap materials which have been suitably ground.

Examples of the preferred organic polymeric particulate materials useful according to the present invention include ground rubber (reclaimed either cryogenically or by other means) and particulate synthetic organic polymers such as phenolics, polyvinyl chlorides, plasticized polyvinyl chlorides, polycarbonates, polystyrenes, nylons, polyethylenes (both low density and high density), polypropylenes, polyurethanes, and the like.

The most preferred organic polymeric material is ground scrap rubber. Suitable sources of rubber particulate material include cryogenically reclaimed rubber scrap as well as scrap rubber of reduced particle size prepared by any of the other well-known reclamation processes.

In selecting a suitable junction modifying particulate material several factors should be considered. In this regard it is desirable to employ a particular material having a specific gravity which is similar to that of the reactant, e.g., polyol, in which the particulate material is dispersed. This will facilitate maintaining the particles in suspension prior to reaction. Moreover, the junction modying particulate material preferably should be chosen such that the surface hardness of the particles is low enough to avoid harmful abrasion or wear of processing equipment e.g., mixers, valves, pumps, metering equipment and the like. In general, this objective best can be achieved by employing the preferred polymeric organic particulate materials of the present invention which typically have the requisite low surface hardness.

The most important factor in the section of a suitable junction modifying particulate material is the size of this particulate material relative to certain other dimensional parameters of the foam system. In general, the selection of particulate material particle size should be such as to result in location of the particle(s) in the junction region. To accomplish this objective it is necessary to carefully observe the critical relationships between the additive particle size and those dimensional parameters of the foam matrix. In general, the minimum particle size diameter is that which, either alone or as a result of agglomeration with other particles, tends to remain located in the junction region. The maximum particle size should be less than that at which particles bridge more than one cell rather than remaining in the natural cell junction.

Referring to FIG. 5, the effects of particle size relative to cell parameters can be schematically demonstrated. FIG. 5(a) shows a cell structure according to the present invention containing large particles and/or agglomerates which because of their size remain located in the cell junction regions. FIG. 5(b) demonstrates similar localization in the junction region by agglomerates of somewhat smaller particles. FIG. 5(c) shows the distribution of very small particles throughout the polymer matrix, including substantially uniform distribution along the struts. Particles that are located in the strut make little contribution to the property improvement by junction modification according to the present invention, and in fact actually reduce the tensile strength of the strut portions. FIG. 5(d) shows very coarse particles which have bridged multiple cells and are too large to achieve the kind of junction modification required according to the present invention.

In general, applicant has found that particles having a minimum size of greater than about 25% of the average strut thickness will tend to agglomerate and locate in the junction region. As indicated above, the upper limit according to the present invention is a particle size which approaches 100% of the average cell size. By way of illustration rather than limitation, cell sizes in polyurethane foams can vary anywhere from about 50 microns for the finest cell material up to about 2500 microns or more for a very coarse cell material. Similarly, strut thickness values can vary from as low as about 10 microns up to about 500 microns or more.

The actual particle size of the junction modifying particulate materials according to the present invention can vary widely, subject to the functional limitations set out above. Particles employed according to the present invention typically will fall within the range of from about 100 microns to about 1,000 microns. Preferred are particle size in the range of about 100 to 400 microns but in many cases particles from about 350 to 1,000 microns will also be desirably utilized. Particles as small as 20 or 30 microns or more may be effectively used if they exhibit the requisite tendency to agglomerate and locate in the junction regions.

Appropriate particle size of the junction modifying particulate material may be achieved by any of the known grinding, crushing or similar size reduction techniques. In general, the manner in which size reduction is affected does not effect utilization of the particulate material in the process of the present invention. The particulate material added according to the present invention normally will be dispersed in the polyol reactant. In those instances where the particulate matter is totally inert to the isocyanate system it is also possible to disperse the particulate material in the isocyanate reactant. A number of the preferred particulate additives, however, (especially recycled scraps) contain various components which are reactive with the isocyanate moiety. For these reasons it is generally preferred to disperse the additives in the polyol reactant.

The proportion of junction modifying particulate material incorporated into the polyurethane foam product of the present invention may be varied according to the nature of the particulate material and the use to which the modified polyurethane foam is to be put. In general, solid particulate materials may be incorporated in the proportion of from about 10 to about 100 parts, preferably about 40 parts, by weight per 100 parts of the polyol, and hollow particulate materials may be incorporated in a proportion of from about 2 to about 50 parts by weight, preferably about 10 parts per 100 parts by weight of the polyol. Based on the total weight of the cellular urethane product this represents an addition level of from about 1 to 60% by weight, depending of course on the density of the filler, with additions of about 10 to 50% by weight being preferred.

As indicated above, the polyurethane foam composition is formed by the reaction of a polyol and a polyisocyanate in the presence of a blowing agent and a catalyst. In general, any conventional employed polyurethane reactants, catalysts, blowing agents or other adjuvants may be utilized in the known manner to produce the product of the present invention.

To form the polyurethanes of the present invention an excess of polyisocyanates relative to the polyol is generally employed. At a minimum, the amount of polyisocyanate used is that generally sufficient to react with the hydroxyl groups of the polyol used and with water, if used, to generate carbon dioxide for blowing the mixture. In general, the ratio between NCO radicals and OH radical can broadly vary from about 0.9:1 to about 5:1 with the preferred NCO:OH ratio being 1:1 to 1.2:1.

The "polyol" reactant utilized according to the present invention can be any of the broad class of active hydrogen containing materials normally employed in the preparation of polyurethane compositions, including polyol/polymer blends of the type described in Stamberger U.S. Re. 28,715. Among the polyols which can be employed are one or more polyols from the following classes of compositions:

(a) Hydroxyl-terminated polyesters;
(b) Alkylene oxide of polyhydroxyalkanes;
(c) Trialkanolamines and alkylene oxide adducts thereof;
(d) Alcohols derived from mono- and polyamines by addition of alkylene oxides;
(e) Non-reducing sugars and sugar derivatives and alkylene oxide adducts thereof;
(f) Alkylene oxide adducts of aromatic amine/phenol/aldehyde condensation products;
(g) Alkylene oxide adducts of phosphorus and polyphosphorus acids;
(h) Polyphenols and alkylene oxide adducts thereof;
(i) Polytetramethylene glycols, and the like.

Illustrative hydroxyl-terminated polyesters are those which are prepared by polymerizing a lactone in the presence of an active hydrogen-containing starter as disclosed in U.S. Pat. No. 2,914,556.

Illustrative alkylene oxide adducts of polyhydroxyalkanes include among others, those adducts of ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimetholpropane, pentaerythritol, xylitol, arabitol, sorbitol, mannitol, and the like, having a molecular weight of at least 500: preferably the adducts of ethylene oxide, propylene oxide, epoxybutane, or mixtures thereof.

Two particularly preferred classes of alkylene oxide adducts of polyhdroxyalkanes are the ethylene oxide, propylene oxide, butylene oxide, or mixtures thereof, adducts of dihydroxyalkanes and of trihydroxyalkanes of the type described in Dwyer U.S. Pat. No. 3,441,523.

The preferred class of alkylene oxide adducts of dihydroxyalkanes contemplated are the polyoxyalkylene glycols, such as the alkylene oxide adducts of diethylene glycol, triethylene glycol, tetraethylene glycol, dipropylene glycol, tripropylene glycol, tetrapropylene glycol, dibutylene glycol, as well as the high molecular weight polyoxyethylene glycols, high molecular weight polyoxypropylene glycols, mixed ethylene-propylene glycols, mixed polyoxyethlene-polyoxypropylene glycols, and the like.

Further examples of suitable polyesters and polyethers for use as the polyol of the present invention are described in U.S. Pat. Nos. 2,814,606; 2,801,990; 2,801,648; 2,777,831; 2,606,162 and 2,432,148. The patents also teach the method of preparing such polyols.

Another useful class of polyols which can be employed are the trialkanolamines which, by reaction with alkylene oxides, form adducts of suitable molecular weight, and the alkylene oxide adducts thereof. Illustrative of the lower molecular weight trialkanolamines include triethanolamine, triisopropanolamine, and tributanaolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines.

The mono- and polyamines are preferably reacted with alkylene oxides which have 2 to 4 carbon atoms, for example, ethylene oxide, 1,2-epoxypropane, the expoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetriamine, 1,3-butanediamine, 1,3-propanediamine, 1,4-butanediamine, 1,2-, 1,3-, 1,4-, 1,5- and 1,6-hexanediamine, phenylenediamines, toluenediamine, naphthylenediamines, and the like.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugar and sugar derivatives contemplated are sucrose, alkyl glycosides such as methyl glucoside, ethyl glucoside, and the like, glycosides such as ethylene glycol glucoside, propylene glycol glucoside, glycerol glucoside, 1,2,6-hexanetriol glucoside, and the like.

A still further useful class of alcohols are the polyphenols, and preferably the alkylene oxide adducts thereof wherein the alkylene oxides have from 2 to 4 carbon atoms. Among the polyphenols which are contemplated are found, for example, bisphenol A, bisphenol F, condenstion products of phenol and formaldehyde, more particularly the novolac resins, condensation products of various phenolic compounds and acrolein, the simplest members of this class being the 1,1,3-tris(hydroxyphenyl)propanes, condensation products of various phenolic compounds and glyoxal, glutaraldehyde, and other dialdehydes, the simplest members of this class being the 1,1,2,2-tetrakis(hydroxphenyl)ethanes, and the like.

Another desirable class of polyols are the alkylene oxide adducts, preferably the ethylene oxide, 1,2-epoxypropane, epoxybutane, and mixtures thereof, adducts of aromatic amine/phenol/aldehyde condensation products. The condensation products are prepared by condensing an aromatic amine, for instance aniline, toluidine, or the like, a phenol such as phenol, cresol, or the like and an aldehyde, preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the polyols. The propylene oxide and mixed propylene-ethylene oxide adducts of aniline/phenol/formaldehyde condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymethaphosphoric acids, and the like are desirable for use in this connection.

Another useful class of polyols are the polytetramethylene glycols, which are prepared by polymerizing tetrahydrofuran in the presence of an acidic catalyst.

The polyols employed can have hydroxyl numbers which vary over a wide range. In general, the hydroxyl numbers of the polyols employed in the invention can range from about 20, and lower to about 200, and higher, preferably, from about 30 to about 150, and more preferably, from about 40 to about 70. The hydroxyl number is defined as the number of milligrams of potassium hydroxide required for the complete hydrolysis of the fully acetylated derivative prepared from 1 gram of polyol. The hydroxyl number can also be defined by the equation:

$$OH = \frac{56.1 \times 1000 \times f}{M.W.}$$

where
OH = hydroxyl number of the polyol
f = functionality, that is, average number of hydroxyl groups per molecule of polyol
M.W. = molecular weight of the polyol.

The preferred molecular weight range of the polyols useful according to the present invention is about 2000–7000. Higher and lower molecular weight material can of course be employed with attendant modification of foam properties.

The organic polyisocyanates that are useful in producing polyurethane products in accordance with this invention are organic compounds that contain at least two isocyanate groups. Such compounds are well known in the art. Suitable organc polyisocyanates include the hydrocarbon diisocyantes, (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-dissocyanatooctane, 1,5-diisocyanato-2,2,4-trimethylpentane, 1,9-diisocyanatononane, 1,10-diisocyanatopropyl ether of 1,4-butylene glycol, 1,11-dissocyanatoundecane, 1,12-diisocyanatododecane bis(isocyanatohexyl)sulfide, 1,4-diisocyanatobenzene, 2,4-diisocyanatotoluene, 2,6-diisocyanatotoluene, 1,3-diisocyanato-o-xylene, 1,6-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenylmethylene diisocyanate, and polymethylene poly(phenyleneisocyanates) have the formula:

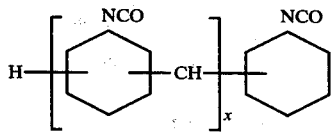

wherein x has an average value from 1.1 to 5 inclusive (preferably from 2.0 to 3.0), and mixtures thereof.

The preferred polyisocyanates are toluene diisocyanates such as 2,4-diisocyanatotoluene and 2,6-diisocyanatotoluene.

The catalysts that are useful in producing polyurethanes in accordance with this invention include: (a) tertiary amines such as bis(dimethylaminoethyl)ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethylanolamine, 1,4-diazabicyclo[2,2,2] octane, pyridine oxide and the like; (b) tertiary phosphines such as trialkylphosphines, dialkylbenzylphosphines, and the like; (c) strong bases such as alkali and alkaline earth metal hydroxide, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravelent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, triocyltin hydroxide, dibutyltin oxide, dioctylin oxide, dilauryltin oxide, dibutyltinbis(isopropoxide), dibutyltinbis(2-dimethylaminopentylate), dibutyltin dichloride, and the like.

The teritary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

When producing the polyurethane foam of the present invention, a small amount of a polyurethane blowing agent, such as water, should be included in the reaction mixture (for example, from about 0.5 to about 5 weight percent of water, based upon total weight of the polymer/polyol composition). Alternative foaming may be facilitated through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents includes thermally unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as a trichloromonofluoromethane. The quantity of blowing agent employed will vary with factors such as the density desired in the foamed product.

It is also within the scope of the invention to employ small amounts, e.g., about 0.001 percent to 5.0 percent by weight, based on the total reduction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of foam stabilizers are the "non-hydrolyzable" polysiloxanepolyoxyalkylene block copolymers such as the block copolymers described in U.S. Pat. No. 3,505,377 and British patent specification No. 1,220,471. The later class of copolymers differs from the above-mentioned polysiloxane-polyoxyalkylene block copolymers in that the polysiloxane moiety is bonded to the polyoxyalkylene moiety through direct carbon-to-silicone bonds, rather than through carbon-to-oxygen-to-silicone bonds. These various polysiloxane-polyoxyalkylene block copolymers preferably contain from 5 to 50 weight percent of polysiloxane polymer with the remainder being polyoxyalkylene polymer.

The formulation, curing and application treatments of polyurethane foam products of the general class to which the novel compositions of the present invention belong are well known to those skilled in the art, and accordingly no extended discussion of these well-known conventional collateral aspects of the invention is deemed necessary. In general, however, the only modification to conventional equipment that is required by the process of the present invention is to provide for the addition and mixing of the junction modifying particulate materials to the reactant (i.e., polyol) mixture tank. This can be accomplished by providing the reactant tank with conventional mixing equipment such as a ribbon mixer, paddle mixer or propeller or combinations thereof. Generally, equipment should be chosen to minimize air entrapment, e.g., by the use of slow speed stirring or other special designs.

While the preferred processing technique for producing the filled polyurethane foam of the present invention is the so-called one shot technique commonly practiced in the art, it will be recognized that the present invention is equally applicable to other known processing techniques such as the pre-polymer technique or quasi pre-polymer technique.

The product of the present invention is a flexible polyurethane foam composition which finds particular utility in the manufacture of furniture, mattresses, carpet underlays, and similar applications. The products of this invention can be formulated to provide products corresponding to any of the normal grade foam products. By the addition of the particulate junction modifying material of the present invention, however, the properties of these normal grade foam compositions may be desirably modified. Among the commonly employed foam grades by which the present invention applies are the following:

| Foam Grade | Typical Use |
|---|---|
| A | Firm seating, sheeting, boat seats |
| B | Majority of lounge seats; mattresses (low grade); sheeting; and kitchen chair backs |
| C | Firm, high quality cushioning |
| D | Dining seats, footstools, etc; boat bunks; and mattresses |
| E | High quality mattress and cushion |
| F | Low cost, low quality, single use packaging |
| G | Lounge backs and overlays |
| H | Seats and mattresses; premium foam |

Of the properties particularly advantageously modified according to the process of the present invention are modulus of compression, tensile strength, tear resistance and elongation. In addition, the density of the foam products modified according to the present invention are affected as well. Moreover, the load deflection curves of the foam products produced according to the present invention are different from those of conventional unfilled polyurethanes and exhibit a more desirable linear response to loading than does the corresponding unfilled foam.

FIGS. 6(a) and 6(b) show load deflection curves for two standard grades of polyurethane foam, with and without the addition of ground rubber according to the process of the present invention. It can be seen that the composition according to the present invention is more linear than the unfilled standard urethane foams. For a complete discussion of the nature and relationship of cushioning foam parameters see van Leuwen et al "Physical and Chemical Approaches to Ideal Cushioning Foams," *Advances in Urethane Science and Technology*, Vol. 2, 1973.

The following examples are intended to illustrate more fully the nature of the present invention without acting as a limitation on the scope thereof. In the examples the following materials were used:

Polyol

Conventional, flexible polyurethane foam type polyols such as VORANOL®3000 and VORANOL®3142A manufactured by the Dow Chemical Company. VORANOL®3000 has an hydroxyl number range of about 54.8 to 57.8 and VORANOL®3142A has an hydroxol number of 42.6 to 46.2.

Organic Polyisocyanate

Conventional, toluene diisocyanate (TDI) such as VORANATE®T80 isocyanate produced by the Dow Chemical Company. VORANATE®T80 isocyanate is a mixture of the 2,4- and 2,6-isomers of TDI in a ratio of 80/20 weight percent.

Ground Rubber

The ground rubber was produced by cryogenic grinding of rubber scrap, a large proportion of which is discarded car tires. Typically, the rubber grind is a -42 mesh, (i.e., passes through 350 micron sieve).

Catalysts

POLYCATT 77® manufactured by Abbott Laboratories.

TD 33 (THANCAT)® manufactured by Jefferson Chemicals.

A1 (NIAX)® manufactured by Union Carbide Corporation.

Silicones

L560 surfactant manufactured by Union Carbide Corporation.

TEGOSTAB®2370 manufactured by Goldschmidt, A. G.

Plasticizer

CORFLEX®880 (di-iso-octylphthalate) manufactured by CSR Chemicals.

Auxiliary Blowing Agent (Freon F11) trichlorofluoromethane

Tin Catalyst

T9 (stannous octoate) manufactured by M&T Chemicals.

In the examples the listed properties were calculated according to the following formulae:

$$\text{Density} = \frac{\text{Weight of Sample}}{(\text{Length})(\text{Width})(\text{Height})}$$

$$\text{Tensile Strength} = \frac{\text{Pulling Force}}{\text{Cross-section of sample}}$$

$$\text{Tear Resistance} = \frac{\text{Pulling Force}}{\text{Thickness of Sample}}$$

$$\text{Elongation} = \left[\frac{\text{Final Length} - \text{Original Length}}{\text{Final Length}}\right] \times (100)$$

$$\text{Hysteresis Return} = \left[\frac{25\% \text{ Return}}{25\% \text{ Original}}\right] \times (100)$$

$$\text{Modulus} = \frac{65\% \text{ ILD}}{25\% \text{ ILD}}$$

EXAMPLES 1–16

Table I sets out the amounts and components of the compositions of Examples 1 to 16. In general each of the foam products produced according to these examples was prepared in the conventional manner on conventional equipment, except that the polyol tank was provided with either a slow-speed vertical ribbon-type stirrer (approximately 100 rpm) or a single-blade high-speed propeller, well submerged and orientated so as to minimize air entrapment (1500 rpm). In each case (as in the conventional process) the polyol and various additives including the junction modifying particulate material (ground rubber) of the present invention were blended in one tank and then quickly mixed with the organic polyisocaynate in a conventional polyurethane slab stock machine. The physical properties of the resultant polyurethane foam structures are given in Table II below. As will be seen in nearly all cases, the properties of the product of the present invention are superior to those of unmodified foams.

In the examples all parts are listed by weight and the examples are prepared according to standards set out in AS-2282.

TABLE I

| Exp. No. | Foam Grade | Ground Rubber | TDI | Polyol | Water | Polycatt 77 | TD33 | L560 | Tego-Stab 2370 | Corflex 880 | Freon F-11 | Tin Cat. T9 | Pigment |
|---|---|---|---|---|---|---|---|---|---|---|---|---|---|
| 1 | A | — | 49.6 | 100** | 3.8 | 0.2 | — | 1.0 | — | — | — | 0.29 | 0.2 |
| 2 | A | 40 | 49.6 | 100** | 3.8 | 0.2 | — | 1.0 | — | — | — | 0.47 | 0.2 |
| 3 | B | — | 49.6 | 100** | 3.8 | 0.15 | — | 1.0 | — | — | 4.0 | 0.29 | 0.2 |
| 4 | B | 40 | 49.6 | 100** | 3.8 | 0.1 | — | 1.0 | — | — | 4.0 | 0.40 | 0.2 |
| 5 | C | — | 35.7 | 100* | 2.5 | — | 0.3 | — | 0.9 | 0.5 | — | 0.20 | 0.2 |
| 6 | C | 40 | 35.7 | 100* | 2.5 | — | 0.5 | — | 0.9 | 0.5 | — | 0.40 | 0.2 |
| 7 | D | — | 44.3 | 100** | 3.0 | 0.2 | — | 1.0 | — | — | — | 0.20 | 0.2 |
| 8 | D | 40 | 44.3 | 100** | 3.0 | 0.3 | — | 1.0 | — | — | — | 0.40 | 0.2 |
| 9 | E | — | 24.26 | 100* | 1.75 | 0.3 | 0.3 | 1.2 | — | 0.90 | 4.0 | 0.16 | 1.0 |
| 10 | E | 40 | 34.5 | 100** | 2.5 | 0.2 | 0.2 | 1.4 | — | 0.93 | — | 0.40 | — |
| 11 | F*** | — | 61.9 | 100** | 5.5 | 0.5 | — | 1.0 | — | 1.17 | — | 0.50 | 0.2 |
| 12 | F | 40 | 61.9 | 100** | 5.5 | 0.5 | — | 1.0 | — | 1.17 | — | 0.50 | 0.2 |
| 13 | G | — | 49.2 | 100** | 3.85 | 0.1 | 0.3 | 2.0 | — | 1.4 | 18.0 | 0.36 | — |
| 14 | G | 40 | 49.6 | 100** | 3.85 | 0.05 | 0.3 | 1.5 | — | 1.4 | 18.0 | 0.60 | — |
| 15 | H | — | 35.3 | 100* | 2.6 | — | 0.18 | — | 0.8 | 0.56 | 2.2 | 0.24 | — |
| 16 | H | 40 | 35.3 | 100* | 2.6 | — | 0.25 | — | 0.8 | 0.56 | 3.0 | 0.40 | — |

*Polyol 3142 (OH# 44.3)
**Polyol 3000 (OH# 56.1)
***Contains 100 parts of fine (~2-5μ) calcium carbonate filler per 100 parts of polyol

TABLE II

| Exp. No. | Grade | Containing Rubber | Density kg/M$^3$ | Tensile Strength kPa | Tear Resistance N/M | Elongation % | ILD 25% | ILD 40% | ILD 65% | Return 25% | Hysteresis % | Modulus |
|---|---|---|---|---|---|---|---|---|---|---|---|---|
| 1 | A | No | 25.5 | 32.4 | 117 | 124 | 165 | 176 | 272 | 105 | 63.0 | 1.65 |
| 2 | A | Yes | 32.3 | 73.5 | 187 | 205 | 119 | 137 | 229 | 75 | 65.5 | 1.94 |
| 3 | B | No | 20.9 | 33.3 | 115 | 121 | 125 | 143 | 197 | 79 | 63.2 | 1.57 |
| 4 | B | Yes | 29.6 | 45.6 | 269 | 156 | 111 | 128 | 215 | 70 | 63.1 | 1.94 |
| 5 | C | No | 36.5 | 65.5 | 252 | 189 | 158 | 178 | 265 | 110 | 69.6 | 1.68 |
| 6 | C | Yes | 46.6 | 81.0 | 318 | 241 | 123 | 143 | 265 | 84 | 68.3 | 2.15 |
| 7 | D | No | 30.1 | 55.4 | 147 | 98.7 | 135 | 157 | 255 | 105 | 77.8 | 1.89 |
| 8 | D | Yes | 38.0 | 64.6 | 280 | 149 | 147 | 170 | 290 | 99 | 67.3 | 1.97 |
| 9 | E | No | 48.2 | 84.0 | 306 | 358 | 115 | — | 247 | 84 | 72.6 | 2.15 |
| 10 | E | Yes | 47.3 | 71.5 | 257 | 221 | 105 | 131 | 152 | 79.5 | 75.7 | 2.39 |
| 11 | F | No | 35.4 | 64.0 | 14 | 63 | 234 | 329 | 469 | 130 | 55.6 | 2.01 |
| 12 | F | Yes | 25.8 | 65.0 | 233 | 155 | 113 | — | 218 | 64 | 56.1 | 2.20 |
| 13 | G | No | 16.0 | 37.3 | 154 | 157 | 70 | 80 | 109 | 45 | 64.3 | 1.56 |
| 14 | G | Yes | 22.2 | 79.2 | 241 | 229 | 57 | 67 | 103 | 37 | 64.9 | 1.81 |
| 15 | H | No | 32.3 | 73.9 | 353 | 269 | 124 | 143 | 206 | 87 | 70.2 | 1.66 |
| 16 | H | Yes | 41.9 | 67.9 | 341 | 225 | 92 | 110 | 190 | 66 | 71.7 | 2.06 |

While certain specific embodiments of the present invention have been described with particularity herein, it should be recognized that various modifications thereof will occur to those skilled in the art. Therefore, the scope of the present invention is to be limited solely by the scope of the claims appended hereto.

I claim:

1. A flexible polyurethane foam material having polymer cell walls and junction regions where a plurality of cell walls intersect, an average cell size in the range of about 50 to about 2,500 microns, and an average strut thickness in the range of about 10 to about 500 microns, and wherein from about 1 to about 60% by weight of said foam material comprises an organic polymeric particulate material having an average particle size that is greater than about 25% of the average cell wall thickness and less than about 100% of the average cell size, said particulate material located primarily in said junction regions.

2. The foam material of claim 1 wherein said organic polymeric particulate material is ground rubber.

3. The foam material of claim 2 wherein said ground rubber has a particle size of from about 100 to about 400 microns.

4. In a process for preparing a flexible polyurethane foam having polymer cell walls, junction regions where a plurality of cell walls intersect, an average cell size in the range of about 50 to about 2,500 microns, and an average strut thickness in the range of about 100 to about 500 microns, said process comprising reacting a polyol, an organic polyisocyanate, a foaming agent and a catalyst, the impovement comprising:
   (a) selecting a particulate material with an average size that is greater than about 25% of said average strut thickness and less than about 100% of said average cell size;
   (b) dispersing said particulate material in one of said reactants in an amount sufficient to comprise from about 1 to about 60% by weight of the total weight of said flexible polyurethane foam; and (c) reacting said polyol, organic polyisocyanate, foaming agent and catalyst to produce said flexible polyurethane foam.

5. The process of claim 4 wherein said particulate material is an organic polymeric material.

6. The process of claim 4 or 5 wherein said particulate material has an average particle size of from about 100 to about 1,000 microns.

7. The process of claim 4 or 5 wherein said particulate material is ground rubber.

8. The process of claim 7 wherein said ground rubber has an average particle size of from about 100 to about 400 microns.

9. The process of claim 5 wherein said organic polyisocyanate is a toluene diisocyanate.

10. The process of claim 4 or 5 wherein said polyol is a polyether polyol having a molecular weight of from about 2,000 to 7,000.

11. The process of claim 4 or 5 wherein said particulate material is dispersed in said polyol prior to contacting said polyol and organic polyisocyanate.

12. The process of claim 11 wherein said particulate material is incorporated in said polyol in an amount of from about 10 to about 100 parts by weight per hundred parts by weight of said polyol.

13. A process for preparing a flexible polyurethane foam having polymer cell walls and junction regions where a plurality of cell walls intersect, said process comprising the steps of:
    (a) dispersing in a polyol from about 10 to about 100 parts by weight ground rubber per 100 parts by weight of polyol, said ground rubber having an average particle size (i) of from about 100 to about 400 microns, (ii) greater than about 25% of the average cell wall thickness, and (iii) less than about 100% of the average cell size; and
    (b) reacting the mixture of step (a) with an organic polyisocyanate in the presence of a foaming agent and a catalyst.

14. The process of claim 13 wherein said ground rubber is derived from recycled scrap materials by reclamation techniques.

* * * * *

UNITED STATES PATENT AND TRADEMARK OFFICE
CERTIFICATE OF CORRECTION

PATENT NO. : 4,452,920

DATED : June 5, 1984

INVENTOR(S) : Michael David Joubert

It is certified that error appears in the above—identified patent and that said Letters Patent is hereby corrected as shown below:

Claim 4, line 5, "100" should read — 10 —.

Signed and Sealed this

Fourth Day of March 1986

[SEAL]

Attest:

DONALD J. QUIGG

Attesting Officer

Commissioner of Patents and Trademarks